United States Patent [19]
Brown

[11] 3,989,994
[45] Nov. 2, 1976

[54] SPACE ORIENTED MICROWAVE POWER TRANSMISSION SYSTEM

[75] Inventor: William C. Brown, Weston, Mass.

[73] Assignee: Raytheon Company, Lexington, Mass.

[22] Filed: Aug. 9, 1974

[21] Appl. No.: 495,960

[52] U.S. Cl. .............................. 321/1.5; 315/39.3; 343/771
[51] Int. Cl.² ......................................... H02M 7/00
[58] Field of Search ............................. 321/1.5, 8 R

[56] References Cited
UNITED STATES PATENTS

| | | | |
|---|---|---|---|
| 2,933,723 | 4/1960 | Brown............................ | 315/39.3 X |
| 2,977,502 | 3/1961 | Brown............................ | 315/39.3 |
| 3,096,457 | 7/1963 | Smith, Jr. et al. ............. | 315/39.3 X |
| 3,432,690 | 3/1969 | Blume............................. | 321/8 R |
| 3,434,678 | 3/1969 | Brown et al.................... | 321/27 R X |
| 3,445,748 | 5/1969 | Crumly .......................... | 321/8 R |
| 3,462,636 | 8/1969 | Seunik et al. .................. | 321/8 R X |
| 3,479,577 | 11/1969 | Ruben............................ | 321/8 R |
| 3,518,688 | 6/1970 | Stayboldt et al............... | 343/771 |
| 3,526,898 | 9/1970 | Plunk et al..................... | 343/771 |
| 3,781,647 | 12/1973 | Glaser............................ | 310/4 X |

Primary Examiner—William M. Shoop
Attorney, Agent, or Firm—Milton D. Bartlett; Joseph D. Pannone; Edgar O. Rost

[57] ABSTRACT

A combined active phased antenna array for satellite solar power station systems includes a plurality of directly coupled microwave energy generators for conversion of the dc power generated by a system of solar energy conversion means to microwave energy. The microwave power is transmitted through space in a narrow beam for capture and rectification at the receiving point. The microwave energy generator devices embodied in the invention are of the crossed field amplifier type having a very high efficiency and extremely long life through the use of a cold cathode secondary emitting electron source. The microwave generated power is transmitted through slotted waveguide radiator arrays with the phase of the energy monitored and corrections are made by phase shifting devices where necessary.

4 Claims, 4 Drawing Figures

SPACE ORIENTED MICROWAVE POWER TRANSMISSION SYSTEM

BACKGROUND OF THE INVENTION

1. Field of the Invention

The invention relates to a system and apparatus for the conversion of solar energy into microwave energy and transmission of such microwave energy through space to a receiving station.

2. Description of the Prior Art

Electrical power has become such an accepted form of energy that the demands have increased at such a rapid rate requiring the exploration for new sources. Unfortunately, present methods of generating electrical power pollute the environment and consume natural resources at a prodigious rate. New technologies have arisen with respect to the transformation of the solar energy directly into electrical power without the necessity of a thermal cycle or any moving parts and with potentially high reliability and long life. Another new technology involves the space program which permits the orbiting of large solar arrays to be illuminated by the sun. The dc power derived from the solar cells can be converted into microwave power and large amounts of such microwave power may be beamed efficiently over long distances of free space by means of a microwave beam. The carefully controlled microwave beam is captured and the microwave energy is rectified at the receiving station. The microwave beam transfer efficiencies run as high as 90 to 95%. To transmit the energy through the earth's atmosphere with relatively small attenuation due to moisture the use of a wavelength of approximately ten centimeters is desirable. The size of the microwave beam apertures necessary for efficient transmission is sufficiently large so that very high power handling capabilities is possible. Passive radiation of waste heat in the microwave energy transmitters is made possible by the large antenna array area and the use of highly efficient microwave generators. For the purposes of the specification the term "micorwaves" refers to energy in that portion of the electromagnetic energy spectrum having wavelengths in the order of 1 meter to 1 millimeter and frequencies in excess of 300 MHz.

The conversion of microwave energy to electrical power has been disclosed in prior art embodiments utilizing rectifier antenna (rectenna) arrays comprising a considerably large number of solid state semiconductor devices such as Schottky-barrier diodes together with half-wave dipoles each terminated in a semi-conductor diode means. A complete rectenna array is disclosed in U.S. Pat. No. 3,434,678 issued Mar. 25, 1969 to W. C. Brown et al and assigned to the assignee of the present invention. The wireless transmission of the microwave energy via beams is preferred due to the relatively high power density which can be focused upon a relatively small area at the receiving location. In accordance with the laws of optics the sharpness of the microwave beam varies as the ratio of antenna dimensions to the wavelength of the transmitted energy. Accordingly, for a given predetermined power density and beam sharpness very short wavelengths of microwave energy facilitates a corresponding decrease in the dimensions of the antenna means for transmitting and receiving. In addition, in long wave or radio-type transmission, difficulties are encountered as a result of natural or man-made interference and noise and this problem is considerably reduced with the transmission of microwave energy. The recent United States space program has demonstrated that the employment of very short microwaves for beamed energy is preferable for penetration of certain atmospheric reflection layers together with the advantages of accurate focusing and high power density of the transmitted energy.

Further examples of the utilization of microwave energy in space applications may be found in U.S. Pat. No. 3,174,705, issued Mar. 23, 1965 to D. Schiff et al, as well as 3,083,528, issued Apr. 2, 1963 and 3,114,517, issued Dec. 17, 1963, both to W. C. Brown. The foregoing patents are also assigned to the assignee of the invention and disclose various conversion means utilizing heat exchangers for conversion of mircowave energy into electrical energy or heat which can be utilized for directly or indirectly propelling a space station.

An example of the satellite solar power station concept is found in U.S. Pat. No. 3,781,647, issued Dec. 25, 1973 to P. E. Glaser. The satellite system includes several geostationary satellites positioned in an energy-receiving relationship to the sun. The solar energy conversion means include guidance and control means to correctly orient the energy conversion means to the source. The large solar cell array is located in an equatorial synchronous orbit around the earth where it is illuminated by the sun with a duty cycle in excess of 99%. The dc power derived from the solar cells is converted into microwave power and beamed to earth.

A most efficient superpower high frequency microwave energy generator operative in the desired band is the Amplitron which has a broad bandwidth and very high efficiency with extremely long life. The electron tube comprises a nonreentrant, non-resonant slow wave propagating structure having two terminations and a continuous cathode capable of emitting electrons from a major portion thereof. Cold cathodes having a high secondary electron emission ratio are particularly desirable in view of the absence of any requirements for power supplies for directly heating oxide-type cathode emitters. The illustrative superpower devices are capable of producing 15 to 20 kilowatts of average power at the desired frequency with capabilities in the region of 500 kilowatts or more of average power and 50 megawatts peak power. A complete description of the Amplitron microwave amplifier devices may be found in U.S. Pat. No. 2,673,306, issued Mar. 23, 1954, 2,859,411, issued Nov. 4, 1958, 2,933,723, issued Apr. 19, 1960 and 2,977,502, issued Mar. 28, 1961 all in the name of W. C. Brown and assigned to the assignee of the present invention. An example of a secondary emissive cold cathode structure is found in U.S. Pat. No. 3,096,457 issued July 2, 1963 to W. A. Smith, Jr. et al.

The current energy crisis throughout the world due to the growing shortage of the world supplies of fossil fuels, such as coal, oil and natural gas due to the increases in the level of consumption has made the search for new sources of energy imperative. The use of solar energy has now been proven in the space program and satellite solar power stations can be developed, hopefully, before the turn of the century. Solar energy offers an almost unlimited source for man's energy needs and the devices for conversion of the dc energy to microwave energy have expected efficiencies of approximately 85 to 90%. The direct coupling of the microwave energy sources to the transmitting phased antenna array should also result in expected transmission efficiencies in the 85 to 95% region. In acordance with the teachings of the referenced satellite solar power station U.S. Pat. No. 3,781,647 the actual size of the solar cell area for collection and conversion of the solar energy would be approximately 25 square miles. The transmitting phased antenna array would be approximately 0.6 of a mile in diameter, assuming a transmitting wavelength of approximately 10 centimeters. A transmitting antenna, illustratively, is designed to provide approximately 10,000 megawatts of beam power which could be supplied by 10,000 microwave energy generators, in 100 rows and 100 panels in each row with each tube having a 1 megawatt output. The present invention achieves the unique arrangement for an active phased antenna array with mircowave generators to provide for the maximum efficiency of the solar power station. Eventually solar power stations having a 200 square mile area would require one to two million microwave tubes for each station.

SUMMARY OF THE INVENTION

In accordance with the present invention a system is provided incorporating a large number of microwave frequency energy converters in an active phased transmitting antenna array with transmission line means coupled to each of the energy converters. An exemplary device the Amplitron utilized has a cold cathode of a pure metal secondary electron emissive material and the combined energy radiated from the transmitting antenna array is transmitted through space in a relatively narrow beam for capture at an earth station. The phased array antenna incorporates waveguide transmission lines with radiating slots and phase comparator means, as well as, phase shifter means in each subarray of Amplitron amplifiers to provide phase coherency in the transmitted signals. The elimination of the heater supplies for the cathodes through the utilization of the cold cathode structures results in substantial savings in weight as well as cost of the satellite solar power station. The cold cathode devices are activated by a coupled RF injected signal which can be generated from another generator source on the station or be fed through space from an earth location.

The passive radiation of generated heat in space is made possible by the large phased antenna array with the direct coupling to the wave transmission line means which results in reduction of waveguide skin losses by reducing the lengths of the waveguide runs in each array. In the space-oriented environment further economies in space, as well as, cost are realized since in the space applications no vacuum envelope is required enclosing the components of the Amplitron converter. The microwave windows and vacuum-tight joints in the envelopes are a major consideration in the cost and weight of such energy converters utilized in the earth environment.

Microwave power generation efficiencies of 85–95% may be realized with the disclosed converters through the utilization of the phased transmitting antenna array and with waveguides directly coupled to each of the energy converters transmission efficiencies of 94% are expected.

BRIEF DESCRIPTION OF THE DRAWINGS

Details of an illustrative embodiment of the invention will be readily understood after consideration of the following description, with reference directed to the accompanying drawings, wherein.

DESCRIPTION OF THE PREFERRED EMBODIMENT

Figure 1:
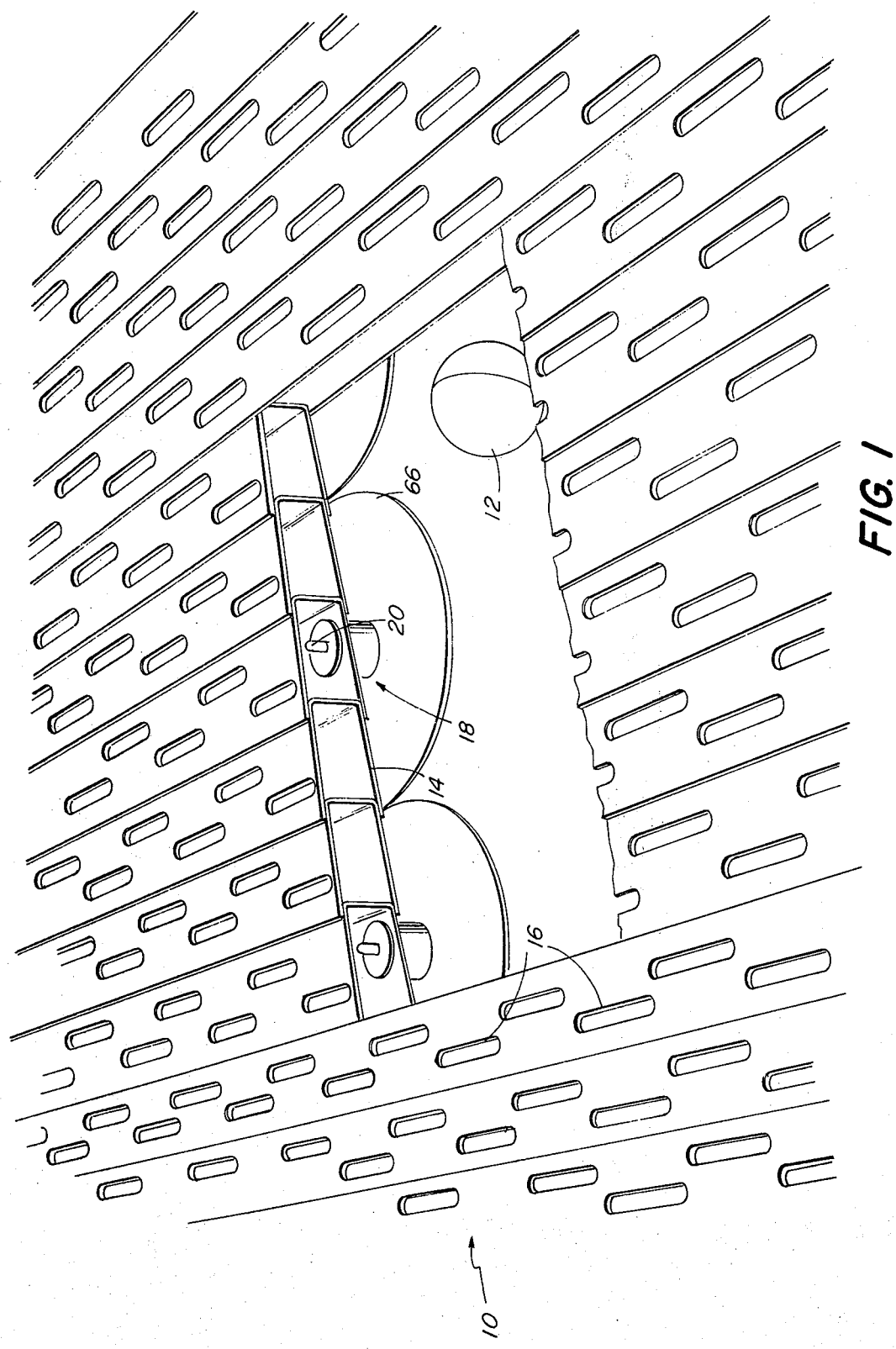
FIG. 1 is an isometric view of a portion of an overall active phased transmitting antenna array embodiment of the invention.

Referring to FIG. 1 the active phases transmitting antenna array 10 is shown supported in space as a part of the satellite solar power station with the earth 12 partially visible through the cut away portion of the antenna. A large number of microwave energy converters, such as the Amplitron are illustrated in a subarray comprising a plurality of waveguide resonator transmission line means 14 having radiating slots 16 in one of the broad walls. In the satellite solar power station concept the radiating slots are oriented in the earth-facing surface to direct the microwave energy beam to the receiving location located on earth 12. The Amplitron microwave energy converter 18 is shown coupled to the slotted waveguide resonators 14 by means of probe member 20.

Figure 2:
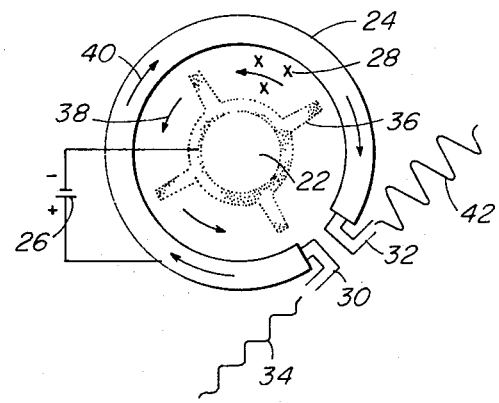
FIG. 2 is a diagrammatic representation of an exemplary microwave energy converter, namely an Amplitron, illustrative of the principles of operation.

Before proceeding with a detailed description of the phased array antenna, the microwave energy converter 18 will be described with reference being directed to FIG. 2. The operating principle of crossed-field devices, such as the Amplitron, is based on synchronous interaction between a reentrant electron beam originating from a continuous cold cathode 22 of a pure metal and RF energy propagating along a slow wave circuit provided by anode 24. Such devices are operated by supplying a static magnetic field parallel to the axis of the cathode and an electric field provided between the cathode and the RF circuit by voltage source 26. The direction of the magnetic field is illustrated by the X 28 and is provided by any well known means including the permanent magnets of such new materials as samarium-cobalt. The RF circuit 24 is nonreentrant unlike the electron beam, and the characteristic impedance of the RF circuit is matched and terminated at both ends by external RF connections, an input 30 and an output 32, over the frequency region desired.

A microwave signal 34 is injected at the input end 30 of the RF circuit. The interaction between the microwave energy on the slow wave propagating circuit 24 and the adjacent electron beam results in a rotating spoke-like space charge 36 which rotates counter-clockwise as indicated by arrows 38 while the RF energy propagates clockwise along the circuit as indicated by arrows 40. The rotating spokes of space charge induce currents in the RF circuit and provide for amplification of the input microwave signals 34 as an amplified signal 42 at output terminal 32 which is coupled to probe member 20 illustrated in FIG. 1 of the transmitting antenna array. Efficiencies of between 80 and 90% have been obtained with the use of the crossed-field Amplitron energy converter. Efficiency values are obtained from the equation efficiency = microwave output-microwave input/dc power input. The long life expected with the use of pure metal cold cathodes, such as platinum for the secondary electron emission along with the absence of the requirement for an evacuated envelope make such devices an attractive microwave energy converter for use in satellite solar power stations. Further details relative to the amplifier may be found in "Crossed-Field Devices," Volume 2, E. Okress, editor-in-chief, Academic Press, 1961, in the chapter by W. C. Brown, pages 165–209.

Figure 3:
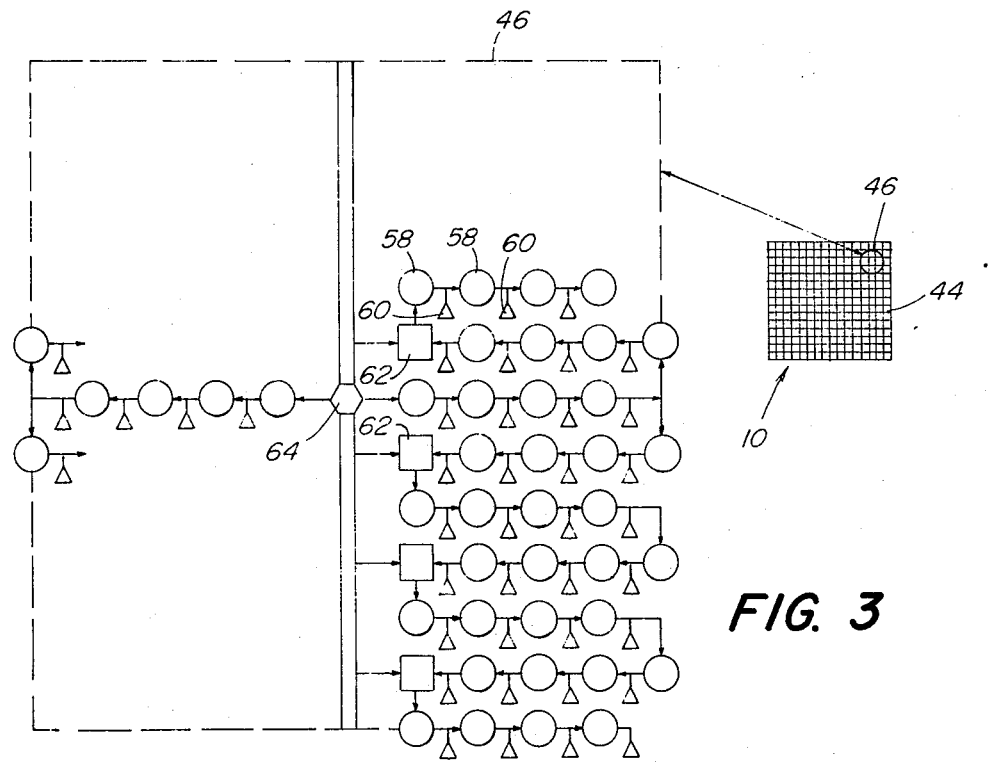
FIG. 3 is a schemmatic view of a portion of a subarray of the overall active phased array antenna embodying the invention.
Figure 4:
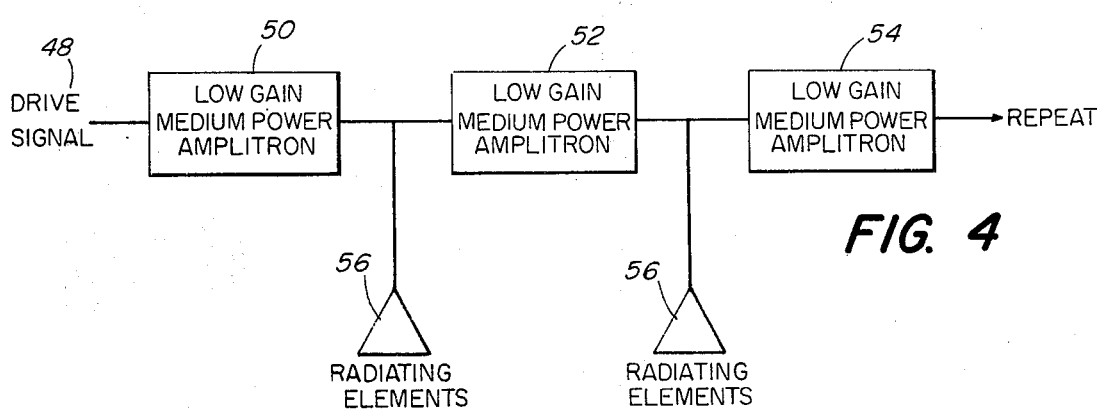
FIG. 4 is a block diagram illustrative of the cascade arrangement of amplifying and radiating elements of the invention.

Referring next to FIGS. 3 and 4, a typical subarray in the phased transmitting antenna array is schematically illustrated. The gridded square 44 represents diagrammatically the overall transmitting antenna array 10. The portion or subarray illustrated is an exploded view of the components disposed within the circle 46 which will now be described. As previously stated, an exemplary antenna array could cover an overall area of 25 square miles for up to 10,000 Amplitron microwave energy converters. Each subarray is provided with means for comparing the arrival phase of a pilot beam from the earth with a reference phase and establishing a low level resultant signal with the appropriate phase. The power level of this signal is then amplified by suitable means to a level appropriate for driving the first Amplitron microwave energy converter. This in turn drives several other Amplitrons which in turn drive the string of cascaded Amplitrons. The phase of the microwave power in the slotted waveguide resonator transmission means is monitored throughout the subarray and corrections in phase are made by the appropriate phase shifting devices.

Referring to FIG. 4 the principle of operation of the overall transmitting antenna including the array of cascaded microwave converters commences with the RF drive signal 48 which is fed to the RF circuit and may comprise a pilot beam from an earth station to establish a reference phase for the overall transmitting antenna. The first Amplitron device 50 becomes operative and drives successive cascaded Amplitron devices 52 and 54 and this arrangement is repeated many times in the overall antenna array. Radiating elements 56, for example, the slotted waveguide resonator transmission line means 14, 16 form the overall beam transmitted from space to the receiving location.

Referring next to FIG. 3 the antenna components are illustrated comprising amplifiers 58, designated by the circles, with coupled radiating elements 60 and intermittently disposed phased comparator and corrective phase shifter means 62 designated by the square box. Centrally disposed and linearly oriented with respect to all of the cascaded amplifiers, antenna radiating elements and phase comparison and shifting means is a central signal source and waveguide transmission means 64 including an RF frequency reference which is either space-fed or a microwave frequency generator mounted in the array. The RF frequency is fed to an electronic phase shifter having a master phase reference. A high gain preamplifier feeds this signal to the first Amplitron device and then to the complete subarray cascaded amplifiers. In this manner a highly efficient microwave beam transfer efficiency may be realized which can run as high as 94%. Large amounts of converted power at microwave frequencies may be efficiently transferred over extremely long distances in free space by means of the transmitted microwave beam formed by the large antenna array incorporating a plurality of subarrays similar to that illustrated in FIG. 3 and designated by the numeral 46. The heat generated by the energy conversion is efficiently radiated in space by fin radiators 66 affixed to each of the Amplitron amplifier devices as shown in FIG. 1. The heat dissipation factor is improved since the radiators radiate from both sides and the average temperature of the fin type cooling radiators approaches 300° C. With both sides of the radiators radiating effectively very low weights structures are required for cooling.

There is thus disclosed an active phased transmitting antenna array comprising a large number of cascaded microwave amplifiers, each directly coupled to waveguide resonator transmission line means to collectively form a phase-controlled microwave beam for transmission of the converted solar energy for collection and conversion to electrical energy at a receiving location. Numerous modifications, alterations and variations in the disclosed embodiment will be evident to those skilled in the art. The foregoing description of an illustrative embodiment, therefore, is to be considered in its broadest aspects and not in a limiting sense.

I claim:

1. In a space oriented system and apparatus for converting solar energy into electrical power including means for converting dc energy into microwave energy, an active phased antenna array for wireless transmission of said microwave energy as a microwave beam directed to earth-based collection and electrical power conversion means comprising:

a plurality of wave transmission line means having energy radiating elements;

an array of a plurality of cascaded dc-to-microwave energy converters adapted to become operative upon injection of a microwave input signal to produce an amplified output signal at a predetermined microwave frequency; and means for directly coupling each of said energy converters to said transmission line means to radiate a microwave beam having a predetermined phase front pattern into free space.

2. A space oriented transmitting antenna array according to claim 1 wherein said wave transmission line means comprise slotted waveguide resonators with said slots being disposed in the earth-facing waveguide walls.

3. A space oriented transmitting antenna array according to claim 2 wherein said means for coupling said energy comprises a probe element extending through the unslotted waveguide walls into said transmission line means.

4. A space oriented transmitting antenna array according to claim 1 and means disposed in combination with subarrays of said energy converters and transmission line for monitoring and controlling the phase front pattern of said transmitted microwave beam comprising means for receiving a microwave energy signal having a predetermined phase to drive said array of cascaded energy converters, means for electronically comparing said received microwave signals with a reference phase signal representative of the phase of the energy converter output signals and phase-shifting means for corrective action.

* * * * *

UNITED STATES PATENT OFFICE
CERTIFICATE OF CORRECTION

Patent No. 3,989,994                    Dated   November 2, 1976

Inventor(s)   William C. Brown

It is certified that error appears in the above-identified patent and that said Letters Patent are hereby corrected as shown below:

Column 4, line 16 - change "phases" to - phased -;

Column 6, line 56 - after "line" insert - means -.

Signed and Sealed this

First Day of February 1977

[SEAL]

Attest:

RUTH C. MASON
*Attesting Officer*

C. MARSHALL DANN
*Commissioner of Patents and Trademarks*